(12) United States Patent
DeClark

(10) Patent No.: US 9,885,378 B2
(45) Date of Patent: Feb. 6, 2018

(54) FLUSH MOUNT SCREW ANCHOR

(71) Applicant: Daniel Dale DeClark, Anaheim, CA (US)

(72) Inventor: Daniel Dale DeClark, Anaheim, CA (US)

(*) Notice: Subject to any disclaimer, the term of this patent is extended or adjusted under 35 U.S.C. 154(b) by 174 days.

(21) Appl. No.: 14/880,025

(22) Filed: Oct. 9, 2015

(65) Prior Publication Data
US 2016/0102696 A1 Apr. 14, 2016

Related U.S. Application Data

(60) Provisional application No. 62/062,140, filed on Oct. 9, 2014.

(51) Int. Cl.
*F16B 13/12* (2006.01)
*F16B 13/08* (2006.01)
*F16B 13/00* (2006.01)

(52) U.S. Cl.
CPC ............ *F16B 13/08* (2013.01); *F16B 13/001* (2013.01); *F16B 13/124* (2013.01); *F16B 13/128* (2013.01)

(58) Field of Classification Search
CPC ..... F16B 13/124; F16B 13/001; F16B 37/122
USPC ................... 411/71–73, 80.1, 80.5, 179, 180
See application file for complete search history.

(56) References Cited

U.S. PATENT DOCUMENTS

| 917,927 A | 4/1909 | Cook | |
| 1,116,545 A * | 11/1914 | Barrett | F16B 13/124 411/68 |
| 1,333,880 A | 3/1920 | Stine | |
| 1,564,947 A | 6/1923 | Copeman | |
| 1,751,818 A * | 3/1930 | Karitzky | F16B 13/124 411/80.5 |
| 2,470,924 A * | 5/1949 | Flogaus | F16B 13/124 411/80.6 |
| 3,130,503 A * | 4/1964 | Rosan | A43B 21/42 36/34 R |
| 3,241,428 A | 3/1966 | Fischer | |
| 3,280,875 A * | 10/1966 | Fischer | E04D 3/3606 411/180 |
| 3,283,642 A | 11/1966 | Ott | |
| 3,383,976 A | 5/1968 | Shenkel | |

(Continued)

FOREIGN PATENT DOCUMENTS

| DE | 2406207 A1 | 8/1975 |
| FR | 2 671586 A1 | 7/1992 |

OTHER PUBLICATIONS

PCT International Search Report; Feb. 5, 2016 (Enclosed herein).

*Primary Examiner* — Flemming Saether
(74) *Attorney, Agent, or Firm* — The Myers Law Group

(57) ABSTRACT

The present screw anchor advantageously has two fins radially extending from the body of the screw anchor, where the fins additionally extend above the top end of the body. This unique fin design permits the user to drive the screw anchor into the worn screw hole within a wood substrate so that the screw anchor is substantially flush or recessed within the worn screw hole. When the fins are aligned with the grain of the wood, the fins split the wood at the grain and prevent rotation of the screw anchor. Because the screw anchor is flush or recessed, the anchor does not interfere with the installation of hardware overtop the anchor, such as a hinge. Furthermore, the original screw, such as in the case of a door hinge, can be reused to create an invisible repair.

11 Claims, 2 Drawing Sheets

(56) References Cited

U.S. PATENT DOCUMENTS

| | | | |
|---|---|---|---|
| 4,210,057 A | | 7/1980 | Goring et al. |
| 4,274,324 A | | 6/1981 | Giannuzzi |
| 5,007,779 A | * | 4/1991 | Goran ................. F16B 5/01 411/41 |
| 5,028,186 A | | 7/1991 | McSherry |
| 5,037,257 A | | 8/1991 | Kubic et al. |
| 5,080,543 A | * | 1/1992 | Murphy ............... F16B 13/124 411/44 |
| 5,147,166 A | | 9/1992 | Harker |
| 5,529,449 A | | 6/1996 | McSherry et al. |
| 5,561,888 A | * | 10/1996 | Lautenschlager ..... E05D 5/0276 16/254 |
| 5,707,097 A | * | 1/1998 | Horwill .................. B60J 1/20 296/91 |
| 6,079,921 A | | 6/2000 | Gauthier et al. |
| 6,250,865 B1 | | 6/2001 | McSherry |
| 8,142,122 B2 | | 3/2012 | McDuff et al. |
| 8,764,364 B2 | | 7/2014 | Brown et al. |
| 2005/0214095 A1 | | 9/2005 | Brown et al. |
| 2011/0268527 A1 | | 11/2011 | Gaudron et al. |

* cited by examiner

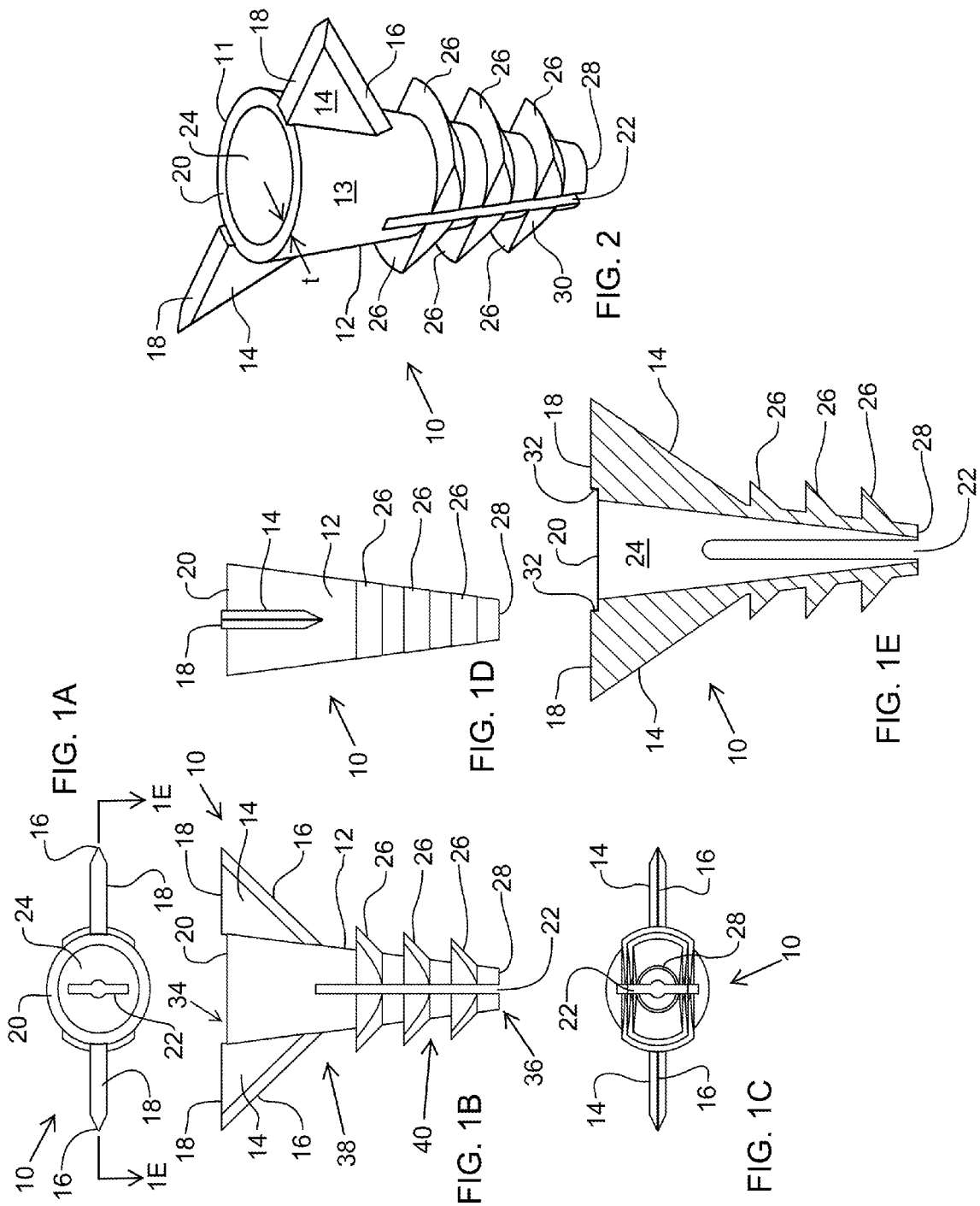

FLUSH MOUNT SCREW ANCHOR

BACKGROUND

The present invention relates to an anchor for a screw or similar fastener, and more particularly, to an anchor for permitting the secure threading of a screw into an over-sized or worn hole.

A persistent problem encountered when replacing mounted hardware is the screw holes within the material become stripped or damaged. For example, when installing door hinges or replacing the strike plate or latch plate, the threads of the wood holes may be worn and enlarged, such that the screw remains loose despite tightening. One repair method includes using a larger screw to match or exceed the hole diameter. However, the larger screw head may protrude from the mounting hole of the hinge or plate. Another method includes inserting and gluing small splints (commonly toothpicks) into the hole to reduce the diameter, often resulting in an uncertain and temporary repair. Yet another repair method involves enlarging the diameter of the hole, driving a glued dowel into the hole, and creating a new screw hole in the dowel. Although effective, this method requires excessive time and labor. A further method of repair may include fastening the hinge to the jamb by driving a long screw (such as a 3 inch drywall screw) through the worn hole and into the jack stud therebehind. The diameter of the long screw head may be too small to provide adequate holding force; and the screw head likely will have a finish that does not match the hinge. Furthermore, there is commonly a shim gap between the hinge jamb and the jack stud, where the long screw may draw the hinge jamb towards the jack stud, closing the shim gap and warping the hinge jamb.

Common plastic expansion-type screw anchors may also be used. However, there are at least three issues with these anchors. First, once inserted, the anchors protrude from the surface of the wood, preventing the proper mounting of the hinge plate against the surface of the wood, so that the hinge plate lies flush within the mortise. Second, many anchors tend to twist as the screw is threaded into the anchor. Finally, the anchors may unintentionally withdraw from the hole when the screws are removed at a future point in time.

What is needed is an anchor that will mount flush or below the surface of the material surrounding the hole to permit proper mounting of the hardware. The anchor should prevent twisting when the screw is torqued. The anchor should be designed to remain within the hole until the user manually removes the anchor. Furthermore, the anchor should be capable of being easily driven into the hole without excessive damage to the material. Moreover, the anchor should facilitate the use of the original screw when possible, to maintain matching hardware, finish, and the like.

SUMMARY

An anchor for receiving a fastener is provided with a body having a bore formed into a top end forming a rim at the top end, the body having an outer surface and a bottom end opposite the top end, and a fin extending radially from the outer surface of the body, at least a portion of the fin extending above the rim. Optionally, a second fin extends radially from the outer surface of the body in a direction opposite from the fin. The body may be a conical frustum and a cylinder.

Again, optionally, the bore may formed through the body where it extends from the top end through the bottom end, or may be a blind bore. A bottom portion of the body is located nearest the bottom end, where at least a part of the bottom portion is bifurcated, split, or slit.

As an option, the fin may be triangular with a first side connected to the outer surface of the body, the portion of the fin extending above the rim forming a second side, and a third side extending between the first side and the second side. The third side may be a tapered leading edge. The first side of the fin may extend partially above the rim to form a step between the second side and the rim. A bottom portion of the body is nearest the bottom end, where at least one tooth extends from the outer surface of the body at the bottom portion of the body.

An anchor for receiving a fastener is provided with a body with a bore formed into a top end to form a rim at the top end, a bottom end opposite the top end, the body with a top portion nearest the top end and a bottom portion nearest the bottom end, the body having an outer surface opposite the bore to form a wall which has a substantially constant thickness at the top portion, and a projection extending from the body, where at least a portion of the projection extends above the rim of the body. The bore may define a longitudinal axis; and the projection may be a fin extending from the outer surface of the body in a radial direction from the longitudinal axis. A second fin may extend radially from the outer surface of the body in a direction opposite from the fin.

An anchor for receiving a fastener is provided with a body with a bore formed into a top end forming a rim at the top end, a bottom end opposite the top end, the body has a top portion nearest the top end and a bottom portion nearest the bottom end, and a fin extending radially from the outer surface of the body, where an outer surface of the top portion of the body is in the shape of either a conical frustum or a cylinder.

BRIEF DESCRIPTION OF THE SEVERAL VIEWS OF THE DRAWINGS

FIGS. 1A-D are top, front, side and bottom views, respectively, of the preferred embodiment of the present anchor;

FIG. 1E is a cross-sectional view of the embodiment of FIG. 1A, taken along section 1E-1E;

FIG. 2 is a perspective view of the embodiment of FIGS. 1A-E; and

Figure 3:
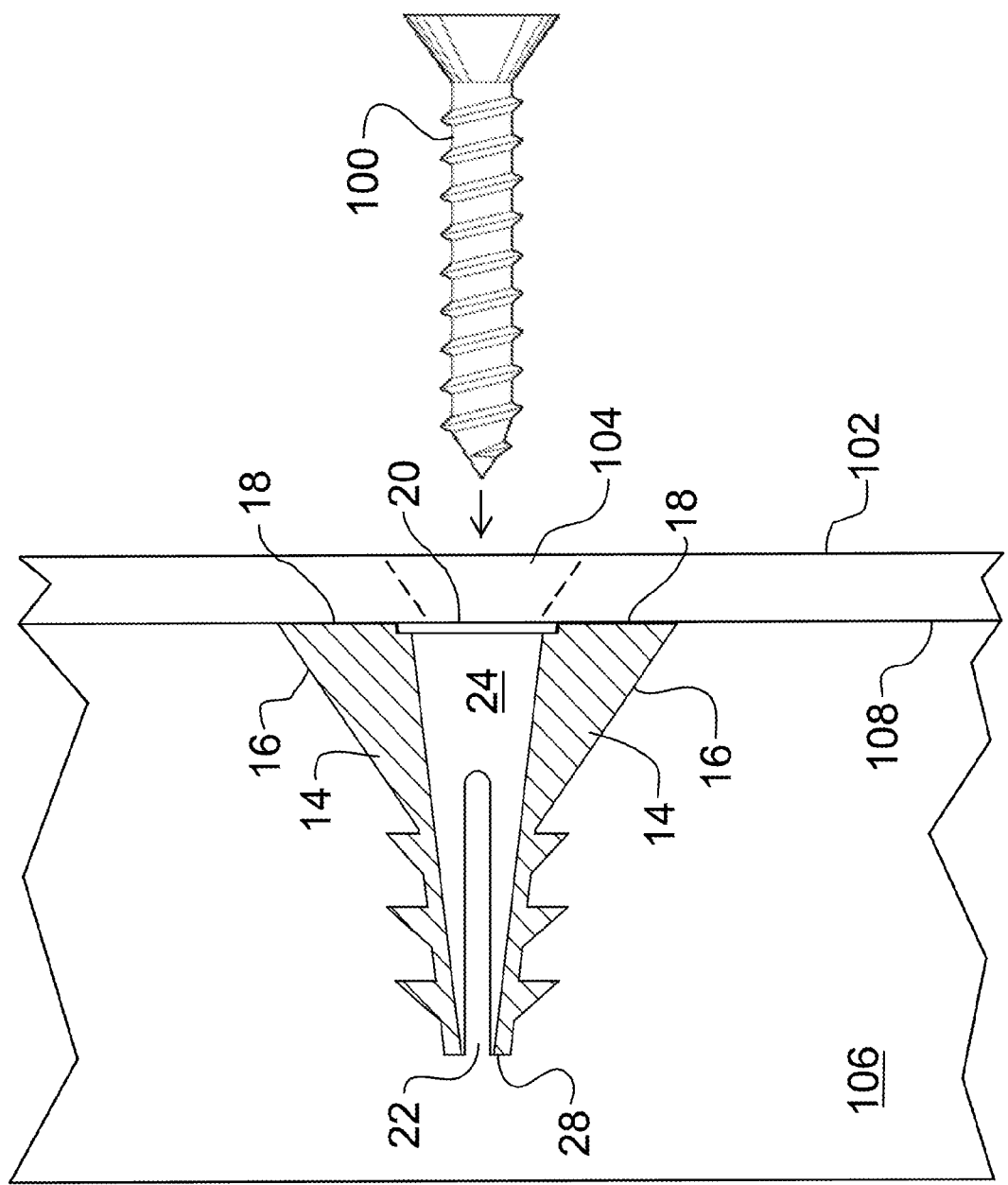
FIG. 3 is a cross-sectional view of the preferred embodiment, showing the present anchor installed within an exemplary base material.

LISTING OF REFERENCE NUMERALS of FIRST-PREFERRED EMBODIMENT screw anchor 10
wall 11
body or barrel 12
outer surface 13
fin or projection 14
base or first side 15
leading edge or third side 16
head or second side 18
rim 20
slit or bifurcation 22
bore or hollow interior 24
teeth 26
tip 28
truncated portion or face 30
step 32
bottom end 36
top portion 38 bottom portion 40
screw 100
hinge frame side plate 102
mounting hole 104
hinge jamb (or strike jamb) 106
jamb surface 108

DESCRIPTION OF THE PREFERRED EMBODIMENTS

The detailed descriptions set forth below in connection with the appended drawings are intended as a description of embodiments of the invention, and is not intended to represent the only forms in which the present invention may be constructed and/or utilized. The descriptions set forth the structure and the sequence of steps for constructing and operating the invention in connection with the illustrated embodiments. It is to be understood, however, that the same or equivalent structures and steps may be accomplished by different embodiments that are also intended to be encompassed within the spirit and scope of the invention.

One example embodiment of the present screw anchor (10) can be seen in FIGS. 1A-E and FIG. 2. The screw anchor (10) is comprised of a body or barrel (12), with two fins (14) radially protruding from the outer surface (13) of the barrel (12) on the top portion (38), and a bore (24) formed axially through the barrel (12). Approximately through the longitudinal center of the bore (24) or along the axis of symmetry of the bore (24) is a longitudinal axis. A slit (22) bisects a portion of length of the barrel (12) through the axis of the barrel (12) and separating the tip (28) of the barrel (12) in a bifurcated design. In an alternate design, the slit (28) may be joined at the tip (28) to form a slot through the barrel (12). In the present exemplary embodiment of the screw anchor (10), the barrel (12) is conical or a conical frustum to permit easy insertion into a hole within the base material; although the barrel (12) can be shaped to suit a particular purpose, such as being cylindrical.

A plurality of teeth (26) or barbs protrude from the outer surface of the barrel (12), located between the fins (14) and the tip (28), on the bottom portion (40). When viewed in cross-section, as shown in FIG. 1E, the teeth (26) are generally wedge or triangular shaped so that, much like a barb, the screw anchor (10) may be easily inserted, yet resists removal from the hole. Although the teeth (26) may be annularly formed about the outer diameter of the barrel (12), a portion of the teeth (26) is truncated immediately adjacent to the slit (22) forming a truncated portion (30) or flat face. At the bottom end (36) the tip (28) of the barrel (12) is designed to split at the slit (22) when a screw is threaded into the bore (24). Because of the splitting at the slit (22), the teeth (26) are further forced into contact with the base material of the hole, such that the teeth (26) mechanically engage the base material to prevent removal (as will be discussed in an illustrative example below). The truncated portion (30) of the teeth (26) is preferably located on the same sides as the slit (22), because this side will not be generally forced closer to the base material; and thus, no teeth are required at this portion (30). Although it is preferred that the barrel (12) not completely split in two, an embodiment the present screw anchor (10) may include a version which does split completely.

Looking more closely at the unique fin (14) design of the present screw anchor (10), it can be seen that the fins (14) are generally triangularly shaped, with a blade-like leading edge (16). A first side or base (15) of the fin (14) is connected to the outer surface of the barrel (12), preferably at the top portion (38). The top portion (38) includes the rim (20). A second side of the triangle is the head (18) of the fin (14), which is designed to receive blows from a hammer or similar tool. The third side of the triangle is the wedge-shaped leading edge (16), with the tapered leading edge (16) generally directed towards the tip (28) of the barrel (12). The fins (14) or other projections protrude above the rim (20) of the barrel (12), such that the head (18) is positioned above the rim (20), with a step (32) between the rim (20) and the head (18).

The outer surface (13) of the top portion (38) of the body (12) is, in one embodiment, either shaped as a conical frustum or a cylinder, with smooth walls. Other that the one or two fins (14) or other similar projections, the outer surface (13) has no protrusions and is smooth. The rim (20) is formed at the top end (34), between the outer surface (13) and the bore (24). To permit the flush or recessed positioning of the anchor (10) within the wood, it is preferable that the rim (20) area not have a flange or other similar thickening or annular protrusion. In this way, the wall (11) at the top portion (38) will have a constant thickness (t), although the thickness may vary at or near the bottom portion (40).

An illustrative example of one potential usage is shown in FIG. 3. In this illustrated example, the hole within the wooden hinge jamb (or strike jamb) (106) has been damaged such that the screw (100) can no longer securely fasten the hinge frame side plate (102) to the jamb (106). The user aligns the screw anchor (10) with the hole in the parent material, a wooden jamb (106) in this example, and manually inserts the screw anchor (10) into the hole, until encountering resistance.

Usually, the grain of the wood jamb (106) runs generally vertically, from floor to ceiling. For best performance, the fins (14) should be aligned with the grain of the wood jamb (106), such that the leading edge (16) of the fin (14) is generally parallel to the grain. So, the user may rotate the screw anchor (10) such that the fins (14) are aligned or generally parallel with the grain of the wood jamb (106). Once aligned, the user may temporarily set the screw anchor (10) in place by applying pressure with the thumb, or the like. Thereafter, the screw anchor (10) may be driven home by one or more hammer strikes to the head (18) of the fins (14).

When aligned, the fins (14) are configured to split the grain of the wood material, where the wedged blade of the leading edge (16) separates or splits the wood, while the general triangular shape of the fin (14) with the tapered leading edge (16) permits the screw anchor (10) to be more easily driven into the wood jamb (106).

Thus, by properly striking the head (18) of the fins (14), the head (18) will be generally flush or slightly sunken beneath the jamb surface (108). Further, because the head (18) of the fins (14) is situated above the surface of the rim (20), the rim (20) of the barrel (12) will be recessed below the jamb surface (108), while the head (18) of the fin (14) will be generally flush with the jamb surface (108). The recessed rim (20) arrangement permits the hinge frame side plate (102) to lie flat against the jamb surface (108), without any gap between the plate (102) and the surface (108).

After setting the anchor (10) within the worn hole, the hinge or other hardware is offered up to the jamb (106), and the user threads the screw (100) through the mounting hole (104) of the plate (102) and into the screw anchor (10). The tip (28) of the screw anchor (10) splits in two due to the slit (22) being further separated by the screw (100). As a result, the teeth (26) are driven into the wall of the original hole of the wood jamb (106), causing the teeth (26) to dig into the wood and prevent removal of the screw anchor (10).

Because the heads (18) of the fins (14) bear the impact of the hammer blows, the rim (20) does not require a strengthening flange or similar thickening of the rim (20). The slim design of the rim (20) permits the rim (20) to easily be driven below the jamb surface (108). Furthermore, the head (18) of the fin (14) is not enlarged in the preferred example embodiment, such that the fins (14) may be completely driven into the wood to a flush or sunken state. The fins (14) prevent the rotation of the screw anchor (10) and aid in holding the screw anchor (10) within the hole through frictional engagement with the wood.

The present screw anchor (10) may be made of numerous appropriate materials, such as a suitable resilient plastic material (like polypropylene, ABS, or other plastic material) or a relatively soft metal, such as a zinc alloy. The screw anchor (10) is preferably injection molded, though other manufacturing methods are possible. Preferably, the present anchor screw (10) is of a unitary construction, though it may be manufactured in multiple parts which are fastened together by glue or other fastening means.

While particular forms of the invention have been illustrated and described, it will also be apparent to those skilled in the art that various modifications can be made without departing from the spirit and scope of the invention. For example, the teeth (26) and the slit (22) are shown in the illustrated embodiment, yet they are not required parts of the invention. The barrel (12) may be conical, as shown, cylindrical, square, or any other profile appropriate for a particular application. The leading edge (16) is shown as being wedge-shaped, yet a square-faced leading edge is compatible with the present design. Furthermore, the fins (14) are shown as being triangular in profile, yet other shapes are compatible with the present invention, such as a square or semi-circular profile. Moreover, instead of fins (14), a projection may extend from the body (12) to permit the flush installation of the anchor (10). Accordingly, it is not intended that the invention be limited except by the claims.

What is claimed is:

1. An anchor for receiving a fastener, the anchor comprising:
    a body having a bore formed into a top end forming a rim at the top end, the body having an outer surface and a bottom end opposite the top end; and
    a fin extending radially from the outer surface of the body, at least a portion of the fin extending above the rim;
        wherein the fin is triangular with a first side connected to the outer surface of the body, the portion of the fin extending above the rim forming a second side, and a third side extending between the first side and the second side, where the third side is a tapered leading edge; and
        wherein the first side of the fin extends partially above the rim to form a step between the second side and the rim.

2. The anchor of claim 1 wherein the bore defines a longitudinal axis, the fin extends radially from the longitudinal axis.

3. The anchor of claim 2 wherein a second fin extends radially from the outer surface of the body in a direction opposite from the fin.

4. The anchor of claim 1 wherein the body is one of a conical frustum and a cylinder.

5. The anchor of claim 1 wherein the bore is formed through the body and extends from the top end through the bottom end.

6. The anchor of claim 5 wherein a bottom portion of the body is nearest the bottom end, at least a part of the bottom portion being bifurcated.

7. The anchor of claim 1 wherein a bottom portion of the body is nearest the bottom end, at least one tooth extends from the outer surface of the body at the bottom portion of the body.

8. An anchor for receiving a fastener, the anchor comprising:
    a body having a bore formed into a top end to form a rim at the top end, a bottom end opposite the top end, the body having a top portion nearest the top end and a bottom portion nearest the bottom end, the body having an outer surface opposite the bore to form a wall which has a substantially constant thickness at the top portion; and
    a projection extending from the body, at least a portion of the projection extending above the rim of the body;
        wherein the bore defines a longitudinal axis, and the projection is a fin extending from the outer surface of the body in a radial direction from the longitudinal axis;
        and further wherein the fin is triangular with a first side connected to the outer surface of the body, the portion extending above the rim is a second side, and a third side extending between the first side and the second side, wherein the third side is a tapered leading edge; and
        wherein the first side of the fin extends partially above the rim to form a step between the second side and the rim.

9. The anchor of claim 8 wherein a second fin extends radially from the outer surface of the body in a direction opposite from the fin.

10. The anchor of claim 8 wherein the projection extends from the outer surface of the body.

11. An anchor for receiving a fastener, the anchor comprising:
    a body having a bore formed into a top end forming a rim at the top end, a bottom end opposite the top end, the body having a top portion nearest the top end and a bottom portion nearest the bottom end; and
    a fin extending radially from an outer surface of the body;
        wherein an outer surface of the top portion of the body is in the shape of one of a conical frustum and a cylinder, and at least a portion of the fin extends above the rim; and
        wherein the fin is triangular with a first side connected to the outer surface of the body, the portion of the fin extending above the rim forming a second side, and a third side with a tapered leading edge extending between the first side and the second side.

* * * * *